Oct. 31, 1961  E. G. SWICK  3,006,673
FOOT RETAINER
Filed Jan. 19, 1959  2 Sheets-Sheet 2

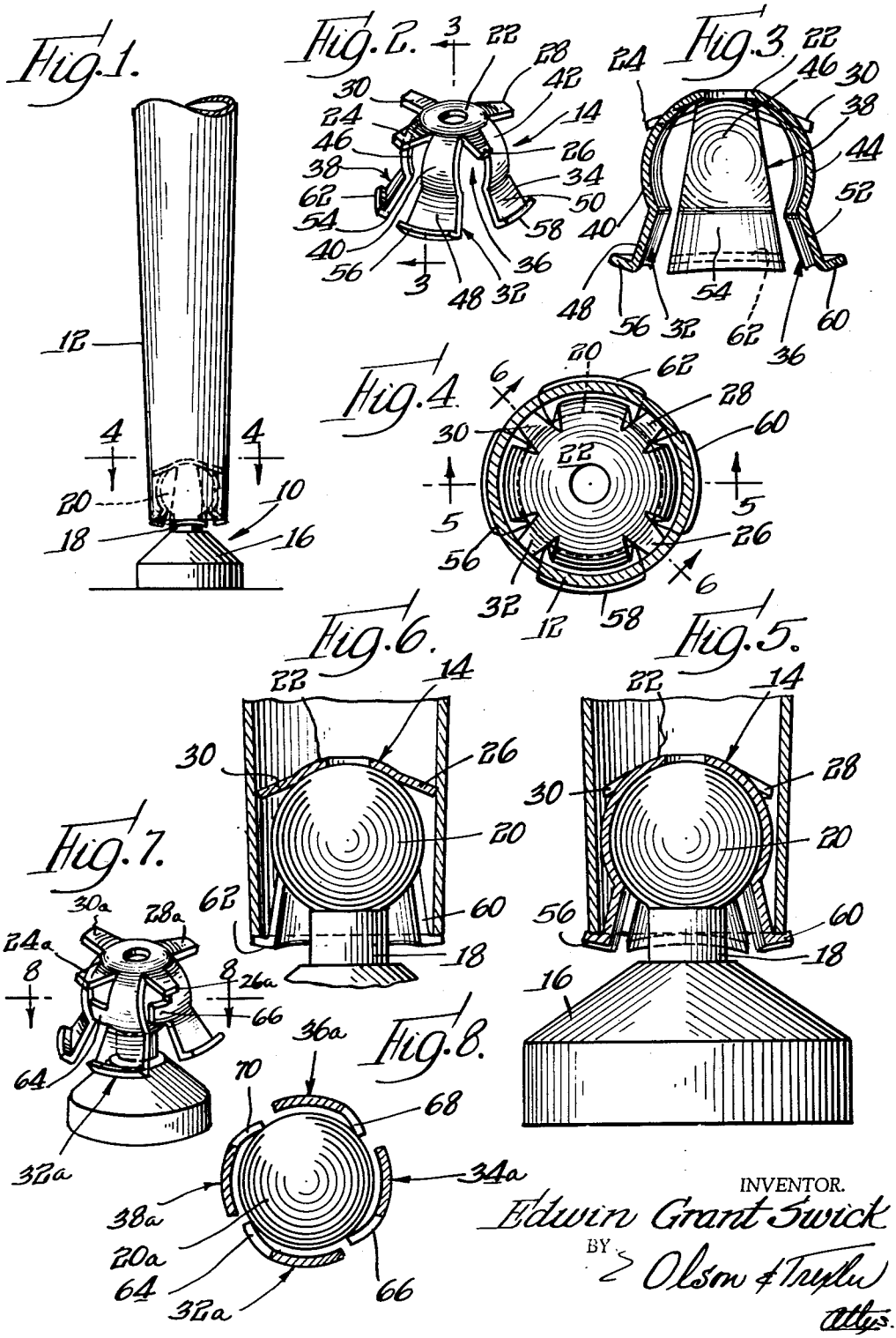

INVENTOR.
Edwin Grant Swick
BY: Olson & Trexler
Attys.

United States Patent Office 3,006,673
Patented Oct. 31, 1961

3,006,673
FOOT RETAINER
Edwin Grant Swick, Bartlett, Ill., assignor to Illinois Tool Works, Chicago, Ill., a corporation of Illinois
Filed Jan. 19, 1959, Ser. No. 787,403
8 Claims. (Cl. 287—87)

The present invention relates to a novel device for connecting a workpiece having an enlargement as an end thereof within a tubular member, and more particularly to a novel device for connecting a foot member or the like with a tubular leg of a piece of furniture.

It is an important object of the present invention to provide a novel device of simple, economical and rugged construction for swivelly connecting a workpiece to a tubular member and more specifically it is an object of the present invention to provide a novel ball and socket connection which may be used for various purposes including the attachment of a foot to the lower end of a tubular leg or a chair, table or other article of furniture.

Another object of the present invention is to provide a novel device or socket member which may be securely applied to the smallest end of a tapered hollow furniture leg member or the like, which device is constructed so that it is restrained against undue advancement into and withdrawal from the tubular member or leg after it has been located in the desired assembled relationship with the leg.

Still another object of the present invention is to provide a novel device or socket member of the above described type which is constructed so that a foot member or other workpiece connected therewith may be swiveled or adjusted to various positions in which it will be retained until further adjustment thereof.

Other objects and advantages of the present invention will become apparent from the following description and the accompanying drawing wherein:

FIG. 1 is a fragmentary elevational view showing a furniture leg and foot assembly including ball and socket connecting means incorporating features of the present invention;

FIG. 2 is a perspective view showing a ball socket member constructed in accordance with the present invention;

FIG. 3 is an enlarged sectional view taken along line 3—3 in FIG. 2;

FIG. 4 is an enlarged sectional view taken along line 4—4 in FIG. 1;

FIG. 5 is a fragmentary partial sectional view taken along line 5—5 in FIG. 4;

FIG. 6 is a fragmentary partial sectional view taken along line 6—6 in FIG. 4;

FIG. 7 is a perspective view showing a ball and socket assembly incorporating a slightly modified form of the present invention;

FIG. 8 is an enlarged sectional view taken along line 8—8 in FIG. 7;

Figure 9:
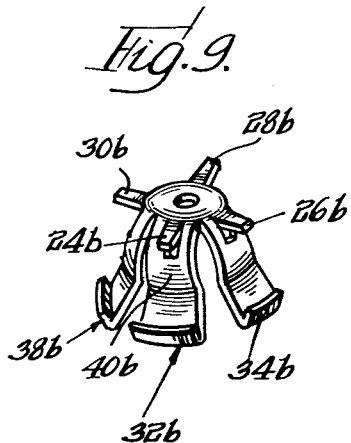
FIGS. 9 and 10 are respectively a perspective view of another embodiment of the present invention and a plane view of a flat blank from which this embodiment is formed.
Figure 10:
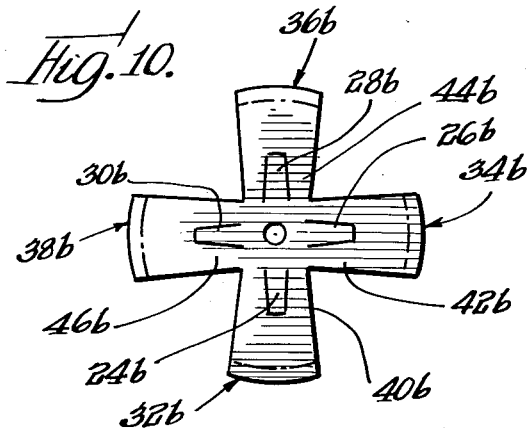
Figure 11:
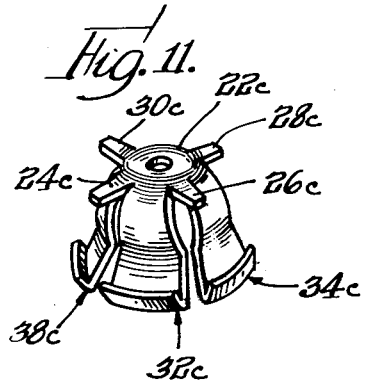
Figure 12:
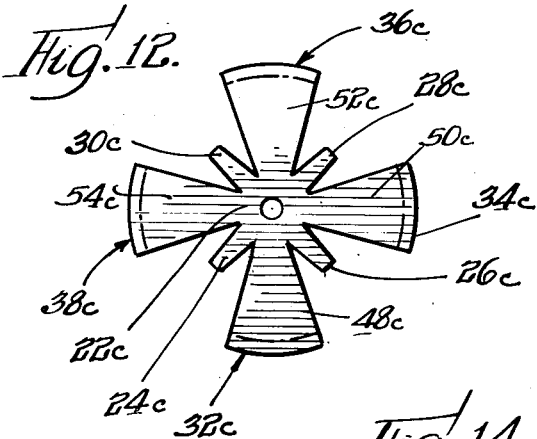
Figure 13:
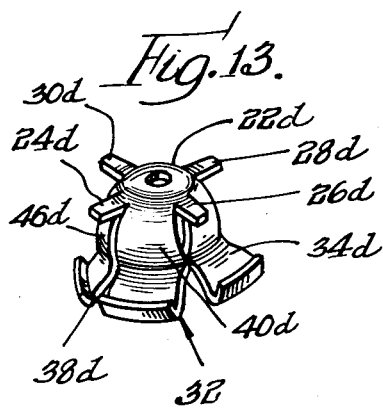
Figure 14:
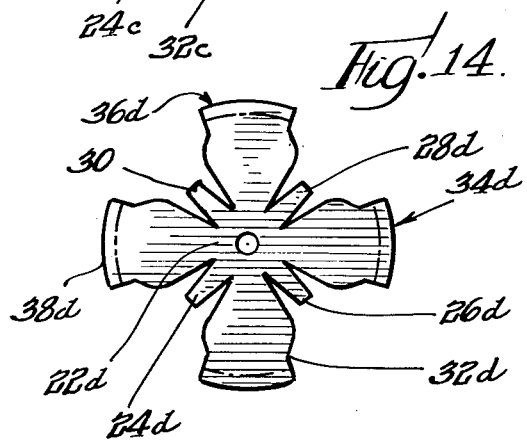

FIGS. 11 and 12 are similar to FIGS. 9 and 10 but show another embodiment of the present invention; and FIGS. 13 and 14 are respectively similar to FIGS. 9 and 10 but show still another embodiment of the present invention.

Referring now more specifically to the drawings wherein like parts are designated by the same numerals throughout the various figures, a foot assembly 10 incorporating features of the present invention is shown in FIGS. 1 and 4–6 connected to the lower end of a tubular member 12 which may, for example, be a furniture leg. While the foot assembly of the present invention is especially suitable for application to the smallest end of a tapering leg as shown in the drawings, it is to be understood that the foot assembly may also be applied to legs of uniform cross sectional shape throughout their length or even to legs which progressively decrease in size rather than increase in size in a direction extending upwardly from the lower end thereof. Furthermore, the foot assembly of the present invention may be constructed so that it is adapted to be applied to tubular members or legs having cross sectional shapes other than the circular cross section of the leg 12 shown in the drawing.

The foot assembly 10 includes a socket member 14 which will be described in detail below, which socket member is adapted to be inserted within the lower end of the leg member 12. A foot member 16 of any desired configuration is connected with a stud 18 having a ball-like free end portion 20 adapted to be received by the socket member 14.

The socket member 14 is constructed in one piece from suitable resilient sheet material, preferably spring steel. The socket member is provided with a central section 22 which preferably is concavo-convex or, in other words, has an inverted dish-shape. Prongs 24, 26, 28 and 30 are symmetrically arranged around the periphery of the central section 22 and extend radially from the central section for engagement with the interior surface of the tubular member or leg 12. It is to be noted that the prongs are initially inclined downwardly as shown best in FIG. 3 or, in other words, the prongs initially provide substantially straight continuations of the dish-shaped central section 22. With this structure, the upper faces of the prongs provide inclined cam surfaces engageable with the end of the leg member 12 during insertion of the socket member into the leg for causing downward and inward deflection of the prongs in a manner which facilitates entry of the socket member into the leg. In this connection it is understood of course that the diameter of a circle containing the ends of all of the prongs in their normal or unflexed positions is greater than the internal diameter of the lower end leg member 12 into which the socket member is to be inserted, or in other words, the distance between opposite ends of the oppositely disposed pairs of prongs 24—28 and 26—30 is greater than the internal diameter of the leg 12. Thus, after the socket member 14 is fully inserted into the leg member 12 as shown best in FIGS. 4–6, the downwardly inclined corners of the square ends of the prongs provide teeth which aggressively engage the leg member for preventing withdrawal of the socket member from the leg member.

The socket member 14 also includes leg sections 32, 34, 36 and 38 which extend generally axially from integral junctions with the central section 22 located between the prongs 24–30. The leg sections respectively include axially and transversely curved portions 40, 42, 44 and 46 which are substantially segments of a sphere and which combine with each other and with the central section 22 in providing a substantially spherical socket for accommodating the ball end of the foot supporting stud 18. The outside diameter of the spherical socket provided by the leg portions 40–46 is less than the diameter of the imaginary circle containing the ends of the prongs 24–30 so that the spherical segments of the legs sections do not interfere with the operation of the prongs.

In order to limit movement of the socket member 14 into the tubular leg member 12, the leg sections of the socket member are provided with means for engaging beneath the lower edge or end of the tubular member. More specifically, the leg sections of the socket member are respectively provided with outwardly flaring portions 48, 50, 52 and 54 which terminate in radially extending and slightly upwardly inclined flanges 56, 58, 60 and 62. The outwardly flaring portions of the leg sections are arcuately shaped in a transverse direction so as to improve the strength and ruggedness thereof. It is to be noted that the diameter of a circle defined by the lower ends of the leg portions 48–54 is greater than the normal diameter of the substantially spherical socket provided by the leg portions 40–46 and also preferably greater than the internal diameter of the lower end margin of the leg member 12. Thus when the socket member is inserted into the leg member 12 as shown in the drawings, the leg portions 48–54 will be flexed inwardly from their normal positions shown in FIG. 3 to the positions shown best in FIGS. 5 and 6. As a result, there is a tendency for the socket portions 40–46 of the leg sections to collapse. Thus the socket portions of the leg sections resiliently grip the ball element 20 and thereby releasably retain the foot member 16 in any position with respect to the leg 12 to which it may be adjusted.

When assembling the various parts described above, the ball element 20 is first snapped into the socket means of the member 14. It will be appreciated that the resilient leg sections 32–38 will readily spring apart to permit reception of the ball element 20. Then the socket member 14 with the ball element 20 assembled therewith is forced into the end of the leg member 12 until the flanges 56–62 engage the lower end of the leg member. As discussed above, the prongs 24–30 will prevent withdrawal of the socket member from the leg 12 and the slightly radially collapsed leg sections of the socket member will serve to prevent withdrawal of the ball 20 and also to releasably restrain the swiveling movement of the foot member 16 with respect to the leg member 12. In this connection it is to be noted that the foot member may be manually adjusted or swiveled to any desired angle relative to the leg member 12. Furthermore this adjustment of the foot member may be accomplished merely by placing the article of furniture which the leg member 12 is a part on the desired supporting surface or floor.

FIGS. 7 and 8 show a modified form of the present invention which is similar to the above described structure as indicated by the application of identical reference numerals with the suffix "a" added to corresponding elements. This embodiment differs only in that the leg sections 32a–38a of the socket member are respectively provided with resilient ball engaging fingers 64, 66, 68 and 70. These fingers project from integral junctions with side margins of the partial spherical portion of their respective leg sections and are provided by material which would otherwise be removed from between the leg sections. These spring fingers which project within the partial spherical segments of the leg sections are adapted to bear resiliently against the ball element 20a so as snugly to retain the ball even in the event that the furniture leg or other tubular member may be somewhat oversized or the ball element is undersized.

FIGS. 9 and 10 show another modified form of the present invention which is similar to the embodiments described above as indicated by the application of identical reference numerals with the suffix "b" added to corresponding elements. This embodiment differs in that the prongs 24b–30b are struck from the material of the leg portions 40b–46b rather than from between these leg portions.

FIGS. 11 and 12 show another embodiment wherein elements corresponding to those described above are indicated by identical reference numerals with the suffix "c" added. In this embodiment the leg sections and more particularly the outer end portions 48c–54c thereof are fan-shaped so that the arcuate width of the portions 48c–54c adjacent the end flanges is similar to one quarter of the circumference of the inner surface of the leg to which the device is to be applied. Thus a substantially continuous flange is provided for engaging the lower edge of the leg for greater strength.

FIGS. 13 and 14 show a structure which is similar to those described above as indicated by the application of identical reference numerals with the suffix "d" added to corresponding elements. In this embodiment the portions 40d through 46d of the leg sections are provided with relatively sharply diverging edges so that their ends are in substantially abutting relationship as shown in FIG. 13. In other words, the ends of the portions 40d–46d have an arcuate extent substantially equal to one quarter of the circumference of the ball so that the device provides a substantially closed spherical socket for receiving the complementary ball of the type described above. While the outer end portions of the leg sections shown in FIGS. 13 and 14 are reduced in arcuate width, these end portions could be formed in the manner disclosed in FIGS. 11 and 12 so that the four leg sections will provide a substantially solid socket structure.

While the preferred embodiments of the present invention have been shown and described herein, it is obvious that many structural details may be changed without departing from the spirit and scope of the appended claims.

The invention is claimed as follows:

1. A one piece sheet material device for connecting a workpiece having an enlarged end portion with a tubular member comprising a central section insertable into the tubular member, a plurality of prongs circumferentially spaced around and extending generally radially from said central section for engaging an interior surface of the tubular member for resisting withdrawal of the device, and a plurality of generally axially extending leg sections spaced around and joined to said central section between said prongs, said leg sections including first portions adjacent said central section combined together for providing a socket for receiving and retaining the enlarged end portion of a workpiece, said leg sections including intermediate portions flaring outwardly from said first portions for engaging an interior surface of said tubular member when said device is inserted within the tubular member for radially collapsing said first portions into gripping engagement with said workpiece end portion, and said leg sections including means adjacent free ends thereof for engaging said tubular member for limiting entry of the device within the tubular member.

2. A one piece resilient sheet material device for connecting a workpiece having a ball-like end portion with a tubular member comprising a central generally concavo-convex section insertable into the tubular member so that the concave side thereof faces outwardly, a plurality of prongs circumferentially spaced around and extending generally radially from said central section for engaging an interior surface of the tubular member for resisting withdrawal of the device, and a plurality of generally axially extending leg sections spaced around and joined to said central section between said prongs and projecting away from said concave side of the central section, said leg sections including first portions in the form of segments of a sphere adjacent said central section and combining together with each other and said central section for providing a generally spherical socket for receiving and positively swivelly retaining said ball-like end portion of the workpiece, and said leg sections including means adjacent the free ends thereof engageable with said tubular member for limiting entry of the device within the tubular member.

3. A one piece sheet material device for connecting a workpiece having an enlarged ball end portion with a tubular member comprising a central section insertable within the tubular member, a plurality of prongs circumferentially spaced around and extending generally radially from said central section for engaging an interior surface of the tubular member for resisting withdrawal of the device, a plurality of generally axially extending leg sections spaced around and joined to said central section between said prongs, said leg sections including first portions adjacent said central section combining together and providing a socket for receiving said enlarged ball end portion of a workpiece, and resilient finger means integral with side edges of said leg portions and projecting laterally from said edges toward immediately adjacent leg portions and also within said socket for snugly and swivelly retaining said enlarged end of a workpiece when the workpiece is assembled with said device.

4. A one piece resilient sheet material device for connecting a workpiece having a ball-like end portion with a tubular member comprising a central dished-section insertable into the tubular member so that a generally concave side thereof faces outwardly, a plurality of prongs circumferentially spaced around and extending generally radially from said central section for engaging an interior surface of the tubular member for resisting withdrawal of the device, and a plurality of leg sections spaced around and joined to said central section between said prongs and extending generally axially from said concave side of the central section, a substantially spherical ball receiving and retaining socket including first curved portions of said leg sections substantially in the form of segments of a sphere and said central section, said substantially spherical ball receiving and retaining socket having a maximum diameter less than transverse dimensions of an imaginary figure defined by ends of said prongs, said leg sections including intermediate portions flaring outwardly from junctions with said first curved portions and having outer ends defining an imaginary circle having a diameter greater than said maximum diameter of the socket, and said leg sections including means adjacent free ends thereof engageable with an end of the tubular member for limiting movement of the device within said tubular member.

5. A device, as defined in claim 1, wherein said prongs are provided by material between adjacent leg sections.

6. A device, as defined in claim 1, wherein said prongs are respectively struck from material of said leg sections.

7. A device, as defined in claim 1, wherein said free end portions of said leg sections complement each other to provide a substantially continuous ring having a diameter similar to an inner diameter of an end of the tubular member to which the device is to be applied.

8. A device, as defined in claim 1, wherein outer ends of said first portions of the leg sections substantially abut each other and complement each other to provide a substantially continuous spherical socket.

References Cited in the file of this patent

UNITED STATES PATENTS

| | | |
|---|---|---|
| 2,529,219 | Kost | Nov. 7, 1950 |
| 2,741,938 | Johnson | Apr. 17, 1956 |
| 2,755,114 | Becker | July 17, 1956 |
| 2,778,597 | Haumerson | Jan. 22, 1957 |
| 2,885,719 | Nordmark | May 12, 1959 |